G. O. BLAIR.
WIND MOTOR.
APPLICATION FILED JUNE 18, 1918.

1,297,066.

Patented Mar. 11, 1919.
3 SHEETS—SHEET 1.

WITNESSES

INVENTOR
George O Blair
BY
ATTORNEY

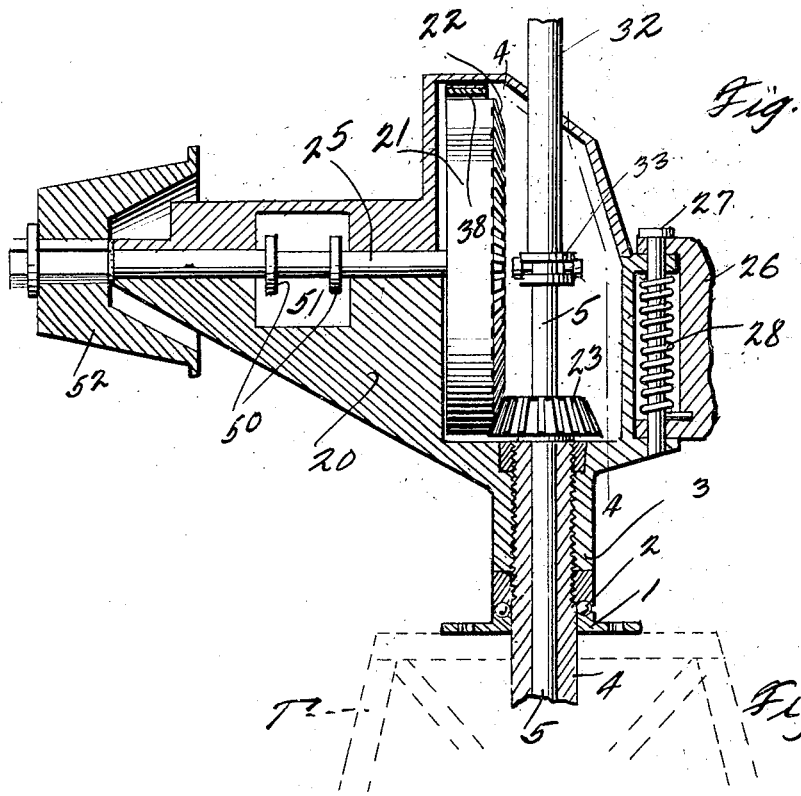
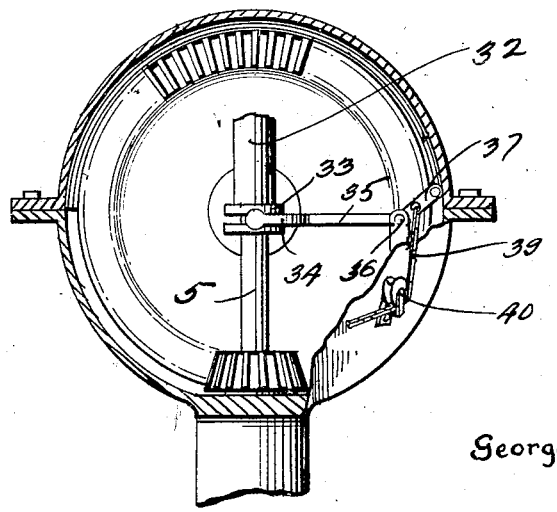

G. O. BLAIR.
WIND MOTOR.
APPLICATION FILED JUNE 18, 1918.
1,297,066.
Patented Mar. 11, 1919.
3 SHEETS—SHEET 3.
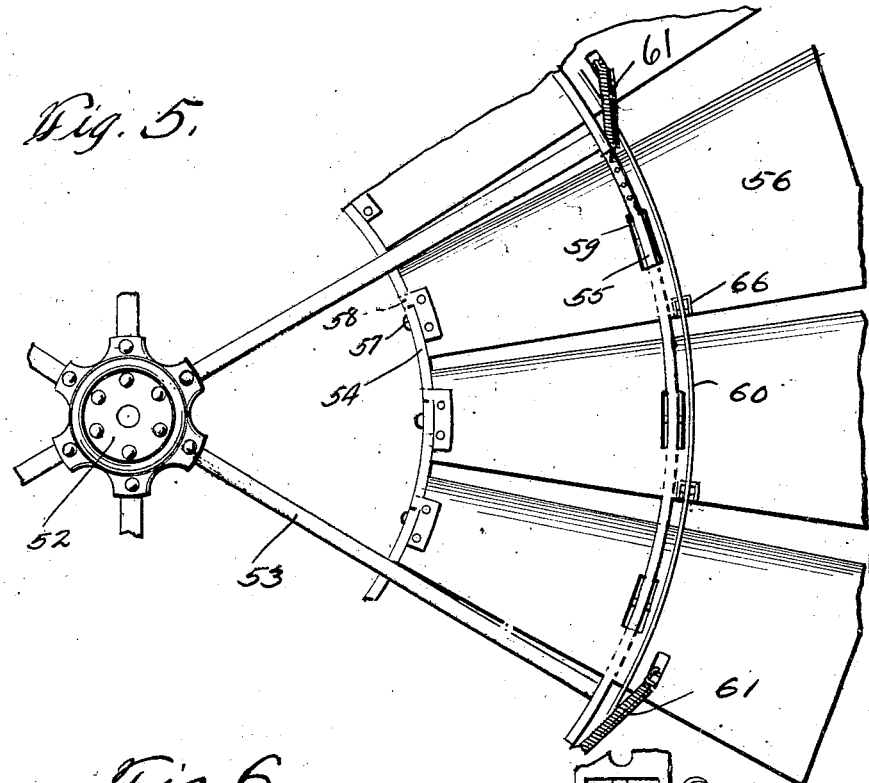
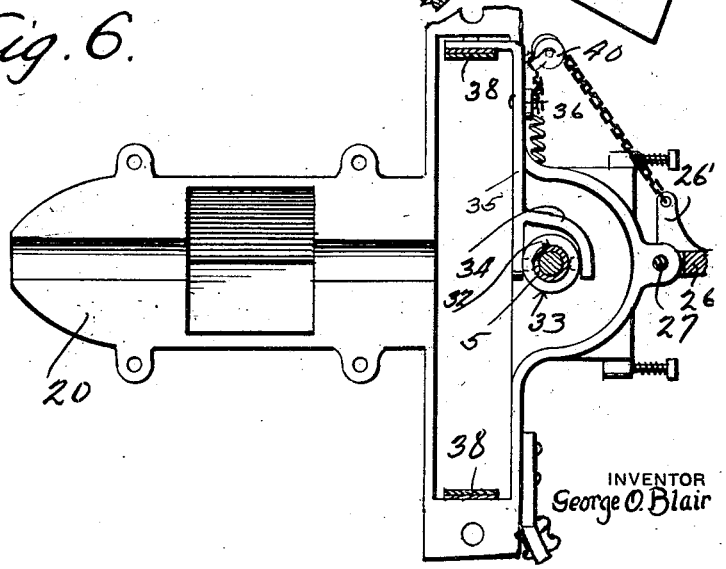
INVENTOR
George O. Blair
BY Richard Bowen.
ATTORNEY

UNITED STATES PATENT OFFICE.

GEORGE O. BLAIR, OF HARRISBURG, COLORADO.

WIND-MOTOR.

1,297,066.   Specification of Letters Patent.   Patented Mar. 11, 1919.

Application filed June 18, 1918. Serial No. 240,567.

*To all whom it may concern:*

Be it known that I, GEORGE O. BLAIR, a citizen of the United States, residing at Harrisburg, in the county of Washington and State of Colorado, have invented certain new and useful Improvements in Wind-Motors, of which the following is a specification.

This invention relates to wind motors, and more especially to those having a wheel rotating on a horizontal axis and a vane automatically moved by a governor to control the position of the wheel; and the primary object of the invention is to simplify the details of construction of the entire machine while losing sight of none of the advantages.

One feature of the invention is a wheel whose blades are automatically set.

Another feature of the invention is a vane automatically adjusted by a governor, yet capable of movement by hand.

Another feature is a brake which is applied to a wheel on the main shaft to retard its rotation as the speed of the wind wheel becomes excessive.

Figure 1:
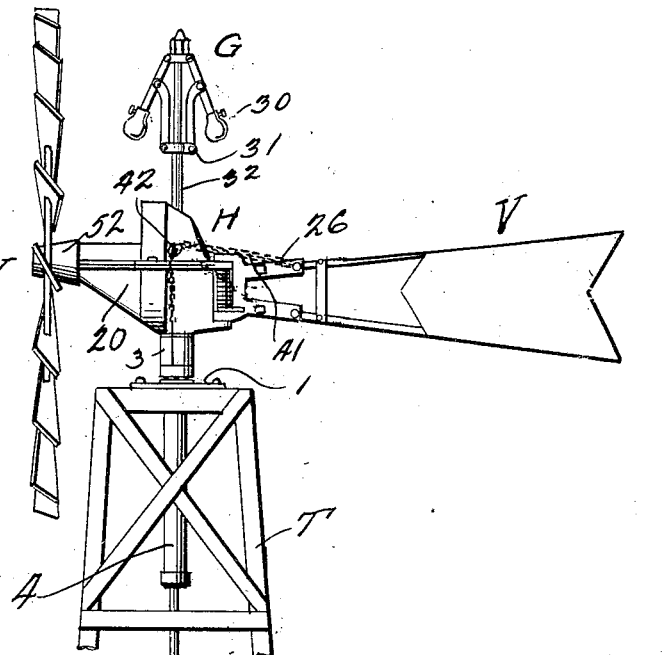
Figure 2:
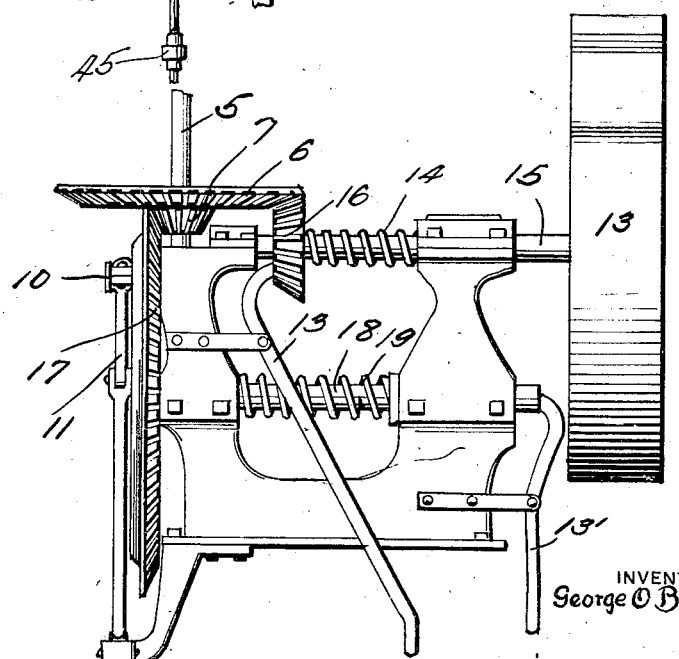

Details are set forth in the following specification and claims, and attention is drawn to the accompanying drawings wherein:

Figure 1 is a side elevation of the head of the tower and of the entire motor mounted therein, Fig. 2 is an enlarged detail in side elevation, showing the mechanism at the lower end of the tower, Fig. 3 is a vertical sectional view through the head, and Fig. 4 is a sectional detail on the line 4—4 of Fig. 3, Fig. 5 is an elevation of a portion of the wind wheel, Fig. 6 is a plan view of the lower portion of the casing forming part of the head, showing also the position of the governor operating lever and the pulleys.

At the top of the tower indicated broadly by the letter T is mounted a bearing plate 1 on which is rotatably mounted the head which is designated broadly by the letter H in Fig. 1, the head carrying at its forward portion the wind wheel W and at the end of the rear portion the vane V, while at the top of the head is the centrifugal governor G whose purpose will be described. Mounted in the bearing plate 1 by ball bearings 2 (see Fig. 3) is a sleeve 3 at the lower end of the head, from which sleeve depends a tube 4 through which passes the vertical shaft 5. At its lower end the latter has a gear 6 and a pinion 7, the former adapted to mesh with a pinion 16 and the latter with a gear 17 as best seen in Fig. 2. The pinion 16 is splined on a shaft 15 and pressed normally toward the gear 6 by a spring 14, while a lever 13 throws these elements out of engagement against the tension of the spring. The shaft 15 carries a pulley 13 from which power may be led to any machine which is to be driven. The gear 17 is fast on a shaft 18 and is borne normally into mesh with the pinion 7 by a spring 19, and a lever 13′ disengages these elements when the gear 17 is not to be driven. To this gear is connected a pump rod 12 by means of a pitman 11 and wrist pin 10 as shown. Therefore, according to which lever is actuated, the upright shaft 5 rotates the pulley 13 or reciprocates the pump rod 12. However, any other suitable use could be made of the rotary movement of the lower end of the vertical shaft 5, without departing from the spirit of my invention.

The head H of the motor comprises an oiltight casing 20 whose lower part carries the sleeve 3 above referred to, and the moving portions of the head are closely contained within this casing. As seen in Fig. 3, the upper end of the vertical shaft 5 carries a pinion 23 meshing with a ring of gear teeth 22 on a pulley 21, the latter being fast on the main shaft 25 which is journaled in the casing and carries the wheel W at its front end. The vane at its inner end is mounted on a casting 26 which is pivoted at 27 to the rear portion of the casing 20, and a spring 28 around the pivot normally turns the vane aside or out of alinement with the main shaft 25 so as to turn the wheel W out of or edgewise to the wind and check or retard its rotation. The means for permitting the spring 28 to perform this function are twofold, consisting of a centrifugal governor and a pull cord as will be described below.

The governor indicated broadly by the letter G is of the centrifugal type, having balls 30 thrown outward when the device operates excessively and drawing upward on a collar 31 which in turn raises a sleeve 32 surrounding the upper end of the vertical shaft 5. Between flanges 33 on said sleeve are mounted pins at the extremities of a fork 34 which is at one end of a lever 35 pivoted at 36 as seen in Fig. 4, and the other arm 37 of the lever controls a band 38 passing over the top of the pulley 21 as seen in Fig. 3. Said arm 37 also carries a wire or chain 39 which leads downward under a pulley 40 and is attached to an elbow 26' on the casting 26 of the vane as shown in Fig. 6. Therefore when the governor rotates rapidly enough to throw out the balls 30, the sleeve 32 rises and the lever 35 is turned on its pivot to loosen on the chain 39 and permit the vane to swing. If the rotation of the governor is quite excessive, the lever 35 is turned on its pivot sufficiently to apply the brake to the rim of the pulley and retard or check the rotation of the main shaft.

From the casting 26 another chain or wire 41 leads in the opposite direction, over a pulley 42, and downward through an appropriate groove in the tube 4 to a handle for the swivel ring 45 (see Fig. 1) which is located near the ground and is in reach of the operator. When now this ring is moved downward, tension on the chain 41 swings the vane aside, so that the wheel W turns out of the wind. Therefore this action may be performed manually by an operator on the ground, as well as automatically by the rotation of the governor G.

The main shaft 25 extends forward from the pulley 21 through the two-part casing as best seen in Fig. 3, and by preference carries collars 50 within a chamber 51 for lubricating purposes, one end of the shaft carrying a hub 52 at the center of the wheel. From this hub radiate arms 53 carrying inner and outer bands 54 and 55, the former passing through the arms and the latter passing around the outer ends. Each blade 56 has a pivot 57 at its inner end in the inner band 54, and a finger 58 adjacent said pivot to limit the axial movement of the blade. Each blade also has near its outer end a slot 59 through which the outer band 55 passes obliquely. A ring 60 is pivotally connected at 66 with one edge of each of the wheel blades, and springs 61 tend to move the ring in the proper direction to throw the fingers 28 into contact with the inner band as seen in Fig. 5. But when the wind blows excessively, the springs will yield and the blades may turn on their axial pivot on the two bands to permit the escape of some wind through the wheel, and therefore the latter will not be injured or the rotation of the wheel sped up by a sudden squall. If the wind should increase in velocity and violence, and maintain its increased speed, the governor G will handle the situation in a manner above described. Nevertheless it is not impossible that manually operable means may be led from the ring 60 to a position on the ground, and therefore while the same constitute no part of the present invention—I reserve the right to apply them. Thus it will be seen that I have produced a machine which includes all the adjustments and details necessary to a successful windmill without unduly complicating the structure and increasing the expense of its manufacture and maintenance.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a wind motor, the combination with a head, a horizontal main shaft journaled in the head, a pulley fast on the main shaft, and a wind wheel carried thereby; of a governor actuated by the rotation of said shaft, a vane hinged to the head, a pivoted lever having one arm connected with said governor, connections between its other arm and said vane, and a brake for said pulley pivoted at one end to the head, its other end being connected with said lever, for the purpose set forth.

2. In a wind motor, the combination with a head, a vertical shaft on which said head is rotatably mounted, a pinion on said shaft, a horizontal main shaft journaled in the head, a pulley thereon having a ring of teeth meshing with said pinion, and a wind wheel at the forward end of said main shaft; of a centrifugal governor at the upper end of the vertical shaft, a vane hinged to said head, connections between said governor and vane for turning the latter aside under excessive movements of said governor, a brake band passing over said pulley, and means for applying the same at the extreme movement of the governor.

3. In a wind motor, the combination with a tower, a head rotatably mounted thereon, a horizontal main shaft journaled within said head, a wind wheel and a pulley on this shaft, and a centrifugal governor; of a sleeve moved by the movements of said governor, a pivoted lever swung by the movements of said sleeve, a vane hinged to the head, a chain connecting said lever and vane for permitting the latter to move aside under excessive speed of the governor, and a brake connected with the lever and applied to said pulley at the extreme movement of said governor.

4. In a wind motor, the combination with a tower, a head rotatably mounted thereon, a horizontal main shaft journaled within said head, a wheel on this shaft, and a vertical shaft driven by the rotation of the horizontal shaft; of a centrifugal governor at the upper end of the vertical shaft, a sleeve moved on said shaft by the movements of said governor, flanges on said sleeve, a pivoted lever having a yoke engaging said flanges, a vane hinged to the head, a spring turning the vane normally aside, a chain connecting said lever and vane for permitting the latter to move aside under excessive speed of the governor, a pulley on said main shaft, and a brake connected with the lever and applied to said pulley at the extreme movement of said governor.

5. In a wind motor, the combination with a head having a sleeve, a vertical shaft on which said sleeve is rotatably mounted, a pinion on said shaft, a horizontal main shaft journaled in the head, a pulley having a ring of teeth meshing with said pinion, and a wind wheel at the forward end of said main shaft; of a centrifugal governor at the upper end of the vertical shaft, a sleeve slidable on said shaft by the movements of the governor, a vane hinged to said head, connections between said sleeve and vane for turning the latter aside under excessive movements of said governor, a brake band passing over said pulley, and connections between said sleeve and band for applying the same at the extreme movement of the governor.

6. In a wind motor, the combination with a head having a sleeve, a vertical shaft on which said sleeve is rotatably mounted, a pinion on said shaft, a horizontal main shaft journaled in the head, a pulley having a ring of teeth meshing with said pinion, and a wind wheel at the forward end of said main shaft; of a centrifugal governor at the upper end of the vertical shaft, a sleeve slidable on said shaft by the movements of the governor, a vane hinged to said head, connections between said sleeve and vane for turning the latter inside under excessive movements of said governor, a brake band within said head and overlying said pulley, and a brake lever pivoted in the head with one arm connected with said band and the other with said sleeve for applying the brake at the extreme movement of the governor.

7. In a wind motor, the combination with a hollow head, a vertical shaft extending therethrough, a horizontal main shaft journaled in the head, gearing connecting the shafts, a pulley fast on the main shaft, and a wind wheel carried thereby; of a governor fast on the vertical shaft, a sleeve adjusted on this shaft by the movements of said governor, a vane hinged to the head, a pivoted lever having one arm connected with said sleeve, connections between its other arm and said vane, and a brake overlying said pulley and fastened at one end within the head, its other end being connected with said lever, for the purpose set forth.

In testimony whereof I affix my signature in presence of two witnesses.

GEORGE O. BLAIR.

Witnesses:
A. W. KNIES,
IRA REYNOLDS.